A. D. WARNER.
LAST CONNECTION.
APPLICATION FILED MAR. 26, 1915.

1,276,293.

Patented Aug. 20, 1918.

WITNESS;
I. F. Taylor.

INVENTOR
Adna D. Warner.
BY
Ernest Hopkins
HIS ATTORNEY

UNITED STATES PATENT OFFICE.

ADNA D. WARNER, OF MISHAWAKA, INDIANA, ASSIGNOR TO MISHAWAKA WOOLEN MANUFACTURING COMPANY, A CORPORATION OF INDIANA.

LAST CONNECTION.

1,276,293. Specification of Letters Patent. Patented Aug. 20, 1918.

Application filed March 26, 1915. Serial No. 17,036.

*To all whom it may concern:*

Be it known that I, ADNA D. WARNER, a citizen of the United States, residing at Mishawaka, county of St. Joseph, and State of Indiana, have invented certain new and useful Improvements in Last Connections, of which the following is a full, clear, and exact description.

This invention relates to last connections, more particularly connections for hollow lasts such as are used in the manufacture of rubber footwear, and has for an object to provide in such apparatus a connection through which the air from the interior of the last may be exhausted without leakage and to which the last may be attached and removed quickly and easily.

In the manufacture of rubber footwear which is subjected to a differential pressure at some stage during treatment of the assembled articles, it is customary to connect the last with a suction pump. To accomplish this with a minimum of handling of the built up articles it is the practice to mount on the car, upon which the lasted shoes are treated in a vulcanizing chamber, a tubular rack, connect the rack with a suitable pump, and through said rack exhaust the air from the interior of the lasts. The suction thus applied, acts through perforations or pores in the foot portion of the last to compact the plies of material constituting the article and produces therein a much more uniform structure than has been considered possible by the common method of manually rolling the outer surface.

Figure 1:
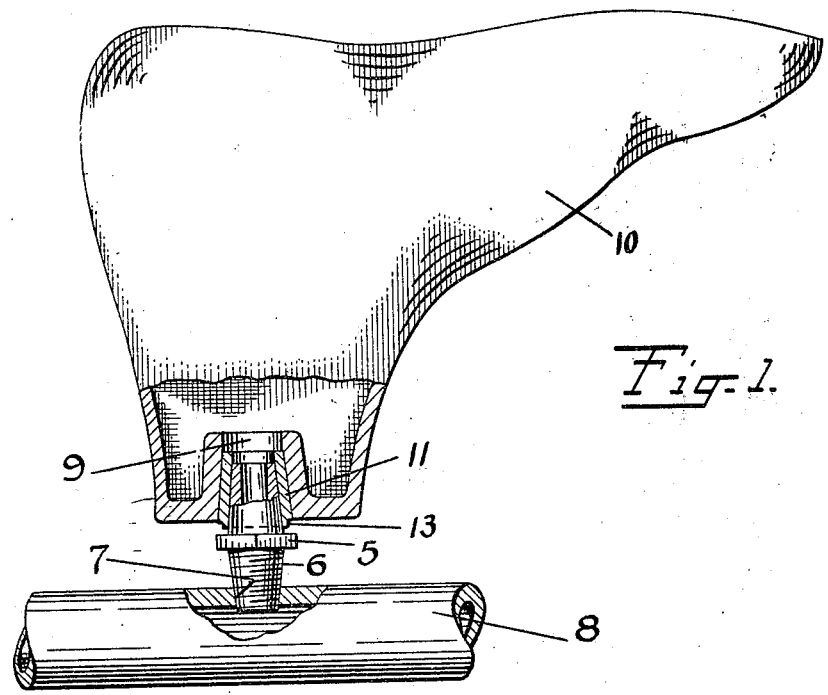
Figure 2:
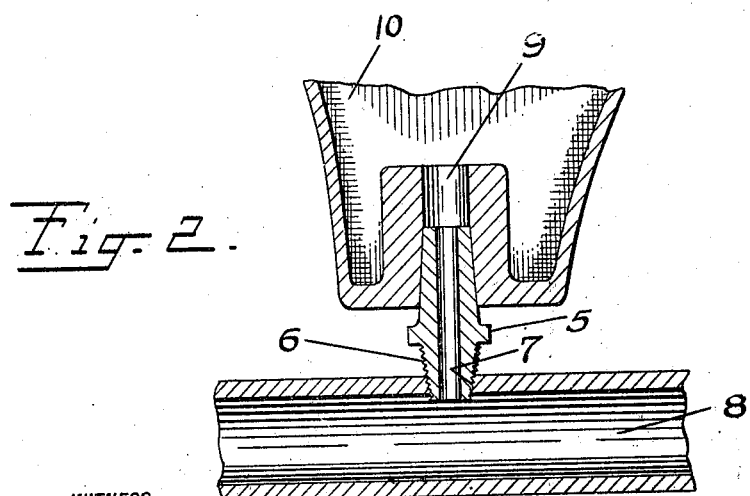

To accomplish the results obtained by the above method efficiently and economically it is necessary that the apparatus be so constructed that the last can be put in place on the frames of the cars and removed therefrom quickly and with a minimum of labor, and it is to meet these requirements that my last connection is adapted; all of which is fully set forth in the following specification and illustrated in the accompanying drawings, wherein:

Figure 1 is a view, partly in section and partly in elevation, of one form of my connection showing its application to a hollow last and conduit; and Fig. 2 is a sectional view of a modified form of the same.

My invention consists in a tapered nipple 5 threaded at one end, as at 6, to engage a correspondingly threaded part 7 in a conduit 8. The tapered end of the nipple 5 is adapted to engage an opening 9 in a hollow shoe last 10. The last 10 may be of any suitable material and I have obtained the best results with one made from a light metal such as aluminum. I do not wish to limit myself to such, however, as it is possible to make the last from a great many substances, metallic or otherwise, capable of withstanding the desired degree of evacuation.

In order to provide a tight fit between the last and the nipple I prefer to provide a bushing shown as at 11 in Fig. 1, this bushing being constructed of material capable of receiving an exact finish to nicely fit the nipple 5 and which will be but little affected by wear. The bushing 11 is finished smooth on both inside and outside surfaces and is preferably held in place in the opening 9 merely by frictional contact. I prefer to cut away two sides of the projecting portion as at 13, to permit the use of a wrench for engagement with or disengagement from the last.

In case it is not necessary to produce a high degree of vacuum in the interior of the last, or if the material of which the last is constructed is sufficiently hard to hold a smooth, even finish, I contemplate dispensing with the use of a bushing between the nipple 5 and the wall of the opening 9 and depending on the direct contact between said parts for a sufficiently tight fit. In Fig. 2 I have illustrated the latter form of construction.

Connections such as I have above described permit the last to be attached to and detached from the receiving frames easily, quickly, and without the need of tools. The tapered members provide a tight joint which is substantially gastight, and it is this tapered feature which I deem to be my invention.

Having described my invention, what I claim and desire to protect by Letters Patent is:

1. In combination with a hollow last of sufficient stiffness to withstand evacuation and having a tapered opening therein, a tapered nipple frictionally engaging the walls of said opening, said nipple being attached to a suitable conduit.

2. In combination with a hollow last of sufficient stiffness to withstand evacuation and having an opening therein, a bushing seated in said opening, and a tapered nipple frictionally engaging said bushing, said nipple being attached to a suitable conduit.

3. In combination with a hollow last of sufficient stiffness to withstand evacuation and having a tapered opening in the body thereof, a tapered nipple frictionally engaging the wall of said last about said opening, and means to evacuate said last.

Signed at Mishawaka, Indiana, this 22nd day of March, 1915.

ADNA D. WARNER.